US005160938A

United States Patent [19]

Fargo et al.

[11] Patent Number: 5,160,938

[45] Date of Patent: Nov. 3, 1992

[54] METHOD AND MEANS FOR CALIBRATING AN INK JET PRINTER

[75] Inventors: Foster M. Fargo, Lincoln; Ted S. Geiselman, Groveland; Alan H. Jones, Arlington, all of Mass.

[73] Assignee: IRIS Graphics, Inc., Bedford, Mass.

[21] Appl. No.: 562,701

[22] Filed: Aug. 6, 1990

[51] Int. Cl.[5] .......... G01D 18/00

[52] U.S. Cl. .......... 346/1.1; 346/140 R; 346/75; 400/279

[58] Field of Search .......... 346/140 R, 1.1, 75; 400/279, 320, 322

[56] References Cited

U.S. PATENT DOCUMENTS

| | | | |
|---|---|---|---|
| 3,916,421 | 10/1975 | Hertz | 346/75 |
| 4,050,075 | 9/1977 | Hertz | 346/75 |
| 4,234,884 | 11/1980 | Vedder | 346/75 |
| 4,277,790 | 7/1981 | Heiben et al. | 346/75 |
| 4,369,450 | 1/1983 | Iwagami et al. | 346/75 |
| 4,509,057 | 4/1985 | Sohl et al. | 346/1.1 |
| 4,540,990 | 9/1985 | Crean | 346/75 |
| 4,626,867 | 12/1986 | Furukawa et al. | 346/1.1 |
| 4,639,736 | 1/1987 | Jochimsen | 346/75 |
| 4,669,900 | 6/1987 | Miyake et al. | 400/322 |
| 4,872,028 | 10/1989 | Lloyd | 346/1.1 |
| 4,922,270 | 5/1990 | Cobbs et al. | 346/140 R |

*Primary Examiner*—Benjamin R. Fuller
*Assistant Examiner*—Alrick Bobb

[57] ABSTRACT

Calibration apparatus for an ink jet printer of the type having a rotary drum which has a cylindrical surface and which rotates about an axis, and a print head which is movable parallel to that axis in an axial direction along the drum surface and between a head home position and a position beyond one end of the drum, the head projecting an ink jet comprised of ink droplets towards the drum surface. The apparatus comprises a needle-like ink jet sensor having a needle tip positioned at a selected distance in the axial direction beyond the one end of the drum and with its axis perpendicular to the drum axis. The sensor is movable in the direction of its axis between a sensor home position at a selected location relative to the drum and a position in which the sensor can intercept the ink jet and the sensor produces a sensor signal when it does intercept the ink jet. The print head and sensor may be moved from their respective home positions so that the sensor intercepts the ink jet; and a entrolier provided for determining and storing the distance in the axial direction from the head home position to the intersection of the ink jet and the sensor; and the distance in the direction of the sensor axis from the sensor home position to that intersection. The method of performing the calibration is also disclosed.

23 Claims, 8 Drawing Sheets

METHOD AND MEANS FOR CALIBRATING AN INK JET PRINTER

This invention relates to ink jet printers. It relates more particularly to method and apparatus for calibrating automatically an ink jet printer so that the printer prints images of high quality. The invention also includes an improved print head for an ink jet printer which enables precise aiming of the printer's ink jets.

BACKGROUND OF THE INVENTION

Ink jet printers have come into widespread use because they can print high quality color images at reasonably high speeds. Such a printer usually comprises a rotary drum for supporting a sheet of paper or other recording medium and a print head which is spaced from the drum surface and moved parallel to the drum axis. The movements of the drum and head are coordinated so that the head scans a raster on the drum surface every rotation of the drum. The print head includes one or more ink nozzles (one for each color ink), each of which can direct a jet of ink droplets to the paper on the drum. The jetters are activated at selected positions in the scan to print an image on the paper composed of an array of ink dots.

Ink jet printing systems can be divided into drop-on-demand and continuous jet systems. In the former, the volume of a pressure chamber filled with ink is suddenly decreased by the impression of an electrical driving pulse whereby an ink droplet is jetted from a nozzle communicating with that chamber. Thus, a single drop of ink is transferred to the paper or other recording medium by a single driving pulse following which the system returns to its original state. During printing, a succession of such droplets is ejected as a jet in response to a succession of drive pulses to print an image on the paper according to a predetermined dot matrix. In the continuous jet-type system, a succession of ink drops is ejected from a jetter or nozzle. Selected ones of these drops are deflected electrostatically into a gutter; the remaining undeflected drops reach the paper on the drum and form the printed image thereon according to a standard dot matrix. While the present invention is applicable to both jet printer types, we will describe the invention primarily as it is applied to a continuous jet-type printer.

Ink jet printers are inherently capable of high speed, high resolution color printing. However, this requires precise manufacture and assembly of the component parts of the printer. Even then, the printer will not print with all colors in proper register unless the printer is calibrated so that the various nozzles on the print head are positioned properly relative to the drum and relative to each other.

In other words, the positions of the printed dots in the direction along the drum (X axis) must be referenced to the home position of the print head. In addition, various nozzles on the print head must be aimed (in yaw) and their actuations timed so that the ink dots produced by all the nozzles at the same dot position in the scan will be in X axis alignment.

The positions of the dots in the direction around the drum are not controlled by aiming the nozzles. Rather, such control is achieved electronically by controlling the timing of the control signals that fire the jets in relation to the instantaneous position or phase angle of the drum. When the printer is calibrated properly both mechanically and electronically, the different color ink dots produced by the nozzles at a given dot position in the raster scan will be superimposed to form a single well-defined ink dot of a selected, usually subtractive, color.

Conventionally, in prior printers of this general type, the mechanical aspects of the calibration procedure have been carried out by an operator observing the dots printed on the paper or other recording medium wrapped around the drum and manually adjusting the yaws of the nozzles on the print head and the timing of the jets so that the dots printed by the various nozzles are in superposition at each dot position in the raster scan. Such manual calibration is a tedious and time-consuming trial and error procedure. Not only must it be performed at the factory when each printer is manufactured, but also, it must be done whenever any maintenance is performed on the printer which effects the positions of the ink dots. For example, the printer must be recalibrated whenever a nozzle is replaced or whenever there is relative movement of the nozzle and its knife edge. It would be desirable, therefore, if means existed on the printer itself for executing the calibration procedure automatically because this would result in considerable monetary savings both in terms of operator time and downtime of the printer.

SUMMARY OF THE INVENTION

Accordingly, it is an object of the present invention to provide an ink jet printer which incorporates apparatus for automatically calibrating the printer so that its nozzles produce ink dots which are in proper superposition at each dot position on the recording medium being printed on.

Another object of the invention is to provide a printer of this type which can be calibrated without requiring any manual mechanical adjustments of the printer parts.

A further object of the invention is to provide an ink jet printer with an improved print head construction which facilitates proper aiming of the printer's ink jet nozzles.

Yet another object of the invention is to provide ink jet printer calibration apparatus which provides accurate control over the aiming of an ink jet printer's ink jet nozzles.

Still another object of the invention is to provide an improved method of calibrating an ink jet printer.

Other objects will, in part, be obvious and will, in part, appear hereinafter.

The invention accordingly comprises the several steps and the relation of one or more of such steps with each of the others and the features of construction, combination of elements and arrangement of parts which will be exemplified in the following detailed description, and the scope of the invention will be indicated in the claims.

Briefly, the calibration apparatus is for use on an ink jet color printer of the type including a support, such as a rotary drum, for supporting a recording medium such as a sheet of paper, and a print head projecting different color ink jets toward the drum that is movable to a home position and parallel to the drum axis so that the jets scan a raster on the recording medium. The apparatus enables the printer to execute an autocalibration procedure so that the different color dots formed by the jets will all be at the correct positions on the recording medium and in register at each dot position.

The calibration apparatus includes an ink jet sensor positioned at a fixed distance in the axial direction beyond one end of the drum. The sensor is movable perpendicular to the drum axis and tangent to an imaginary extension of the drum surface between a home position which bears a fixed relationship to the drum and a position at which the sensor can intercept the jets from the print head when the print head is moved opposite the sensor. Preferably, the sensor is positioned at the, same position relative to the print head as the intersection of the ink jet with the recording medium on the drum so that calibration is with respect to the actual dots printed on the recording medium.

When the sensor does intercept or intersect an ink jet, it initiates a signal indicating such contact. Also, head home and sensor home detectors are provided which emit characteristic signals when the head and sensor are in their respective home positions. During the calibration of each jet from the print head, the print head and sensor are moved from their respective home positions so that the sensor intercepts that jet. Then, using the signals from the head and sensor home detectors and the jet intercept signal from the sensor, the apparatus determines and records the distances to the intersection of the ink jet and sensor from the head and sensor home positions, respectively. Once this data for all of the ink jets is recorded, the apparatus can determine the relative separation between the placement of each printed dot produced by one jet used as a reference and the placements of the corresponding dots formed by the other jets, both along the drum (X axis) and around the drum (Y axis). With this information, the printer's controller can control the timing of the ink jets so that the dots laid down by the first or reference nozzle unit on the print head will be at the proper locations in the scanned raster and so that the corresponding dots formed by the other nozzle units of the head will be in register with the reference ink dots.

The calibration apparatus also includes means for preventing the buildup of ink on the sensor that could adversely affect the jet position measurements and for confining and collecting the ink issuing from the print head during calibration so that the ink does not interfere with that process or subsequent printing by the printer.

Preferably, the calibration apparatus employs a conductive needle as the sensor and executes a special routine or program to be described later to make the jet position measurements in a way that optimizes the calibration results.

Also, the printer itself is provided with an improved print head which facilitates the calibration by monitoring ink droplet velocity and automatic aiming of the ink jet nozzle units. The printer also provides ancillary advantages including easy installation and replacement of the nozzle units and relatively low manufacturing and assembly costs overall.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
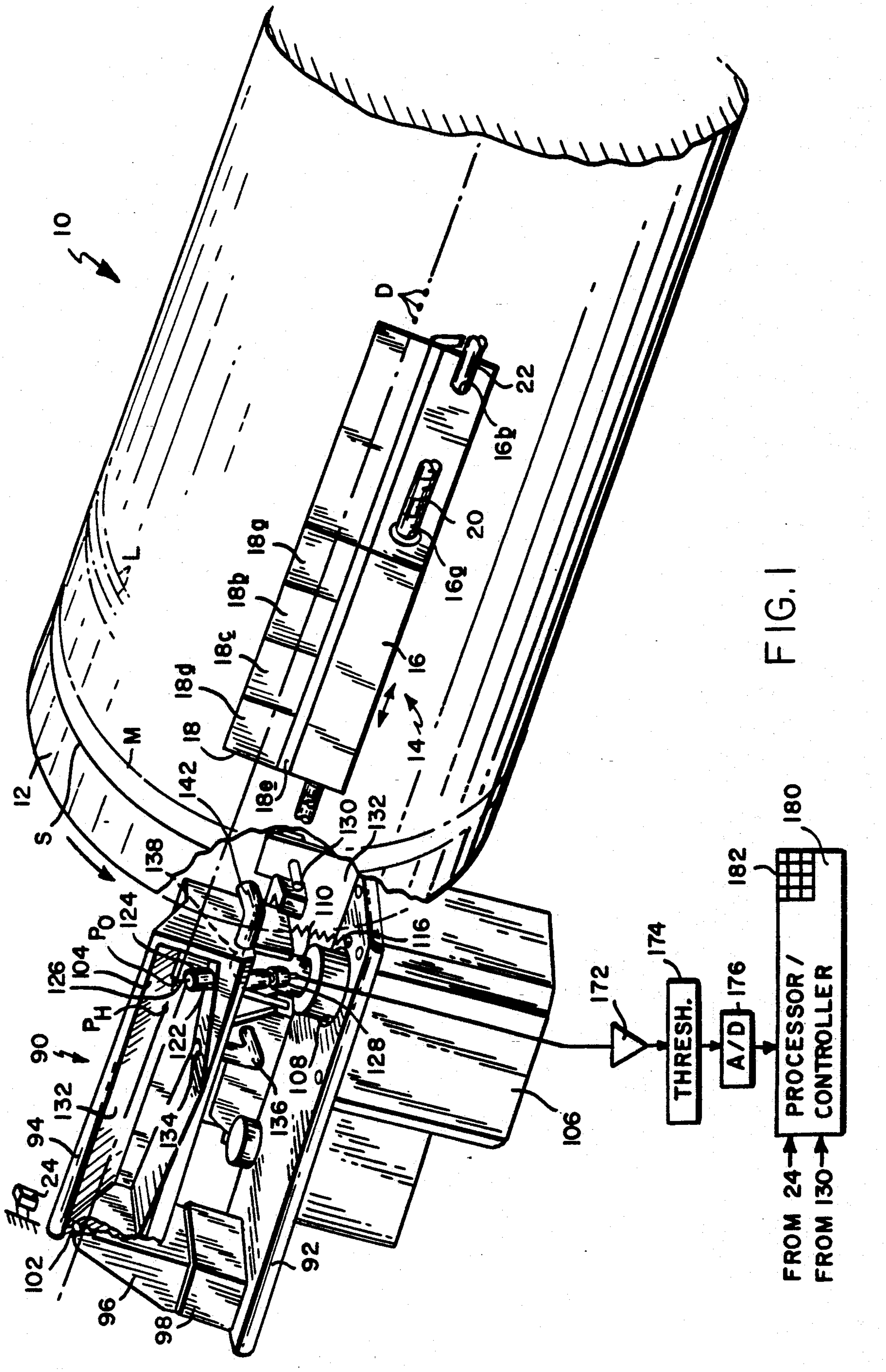
FIG. 1 is an isometric view with parts broken away showing an ink jet printer incorporating calibration apparatus made in accordance with this invention.
Figure 2:
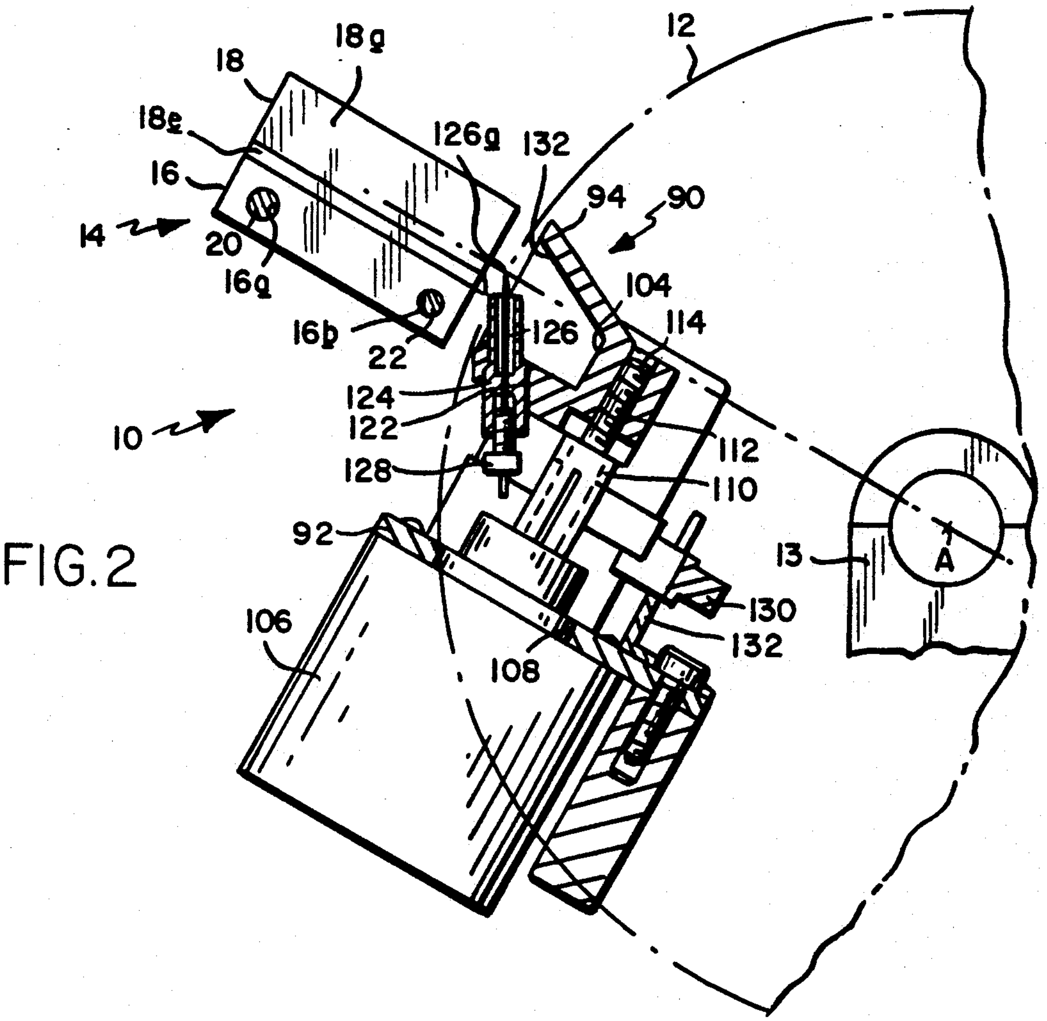
FIG. 2 is a sectional view, with parts in elevation, showing the calibration apparatus of the FIG. 1 printer in greater detail.

Referring now to FIGS. 1 and 2 of the drawings, an ink jet printer shown generally at 10 includes a drum 12 rotatively supported by the printer's main frame 13 (FIG. 2) so that the drum can be rotated about the axis A in the direction indicated by the arrow in FIG. 1. Wrapped around drum 12 is a recording medium which, in the illustrated example, is a paper sheet S.

Printer 10 also includes a carriage shown generally at 14 comprising a block 16 which supports a print head 18. Block 16 has a lateral threaded passage 16*a* for receiving a lead screw 20 and a lateral smooth wall passage 16*b* for receiving one or more guide rods 22, both passages being oriented parallel to the drum axis A and extending beyond the opposite ends of the drum. Print head 18 includes four sections 18*a* to 18*d* mounted to a common base plate 18*e* which is, in turn, secured to the top of block 16 by fasteners 23.

During operation of the printer 10, drum 12 is rotated in the direction of the arrow in FIG. 1 by suitable motive means (not shown) and lead screw 20 is rotated by a reversible stepper motor (not shown) so that carriage 14 can be moved back and forth along the drum and to a home position $P_H$ which, in printer 10, is to the left of the drum and a position beyond the opposite end of the drum. A home sensor 24 mounted to the machine frame detects when the print head is at its home position $P_H$.

While the drum and carriage are moving as aforesaid, the print head sections 18*a* to 18*d* can be actuated so that they emit jets or streams of ink droplets D to the sheet S on drum 12 so that the jets scan over the surface of sheet S line-by-line in a raster format. In drum printers generally, the lines of the raster can either be along the drum or around the drum. The illustrated printer 10 sweeps out the latter type of raster as indicated by the circumferential lines L in FIG. 1. Thus by actuating the print head sections 18*a* to 18*d* at appropriate times in the scan, printer 10 can print characters composed of dots or a full dot image on the sheet S on drum 12. Usually, printing is controlled so that it occurs in an image or print area between a left margin indicated at M in FIG. 1 and a right margin (not shown) at the opposite end of the drum 12.

As is customary in printers of this type, the ink jets from sections 18*a* to 18*d* may be of the three primary subtractive colors, i.e. cyan, magenta and yellow, as well as black. Thus by selectively actuating the print head sections, the colored inks can be laid down one over the other so as to imprint a full-color dot image on the paper sheet S.

As noted previously, although the present invention is applicable to drop-on-demand and continuous jet printing, the printer 10 specifically illustrated herein is of the latter type. The operation of such printers is well known and is described, for example, in U.S. Pat. No. 4,639,736, owned by the assignee of the present application. The contents of that patent is hereby incorporated herein by reference. The print head sections 18*a* to 18*d* are substantially identical and operate in more or less the same way as the corresponding units described in said patent. Therefore, we will describe further only the specific features of sections 18*a* to 18*d* that apply to the present invention.

Figure 5:
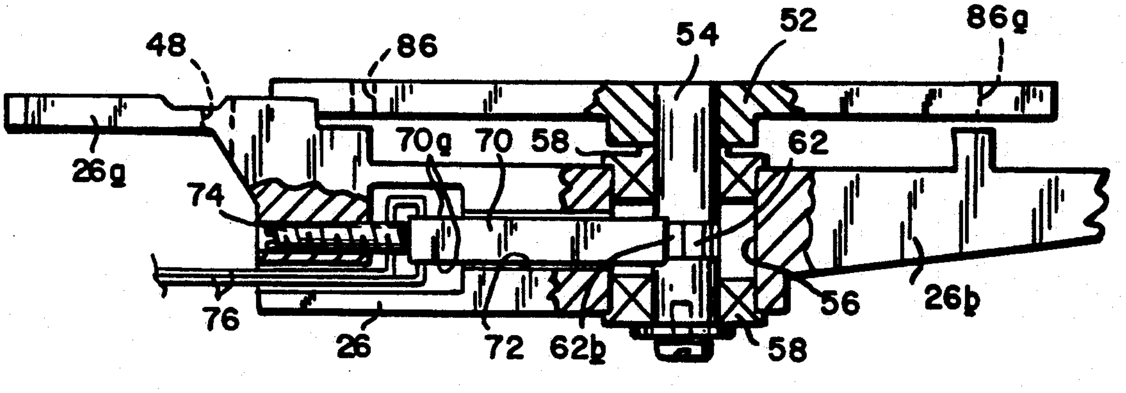
FIG. 5 is a left side view, with parts broken away, of a portion of the FIG. 3 print head.
Figure 3:
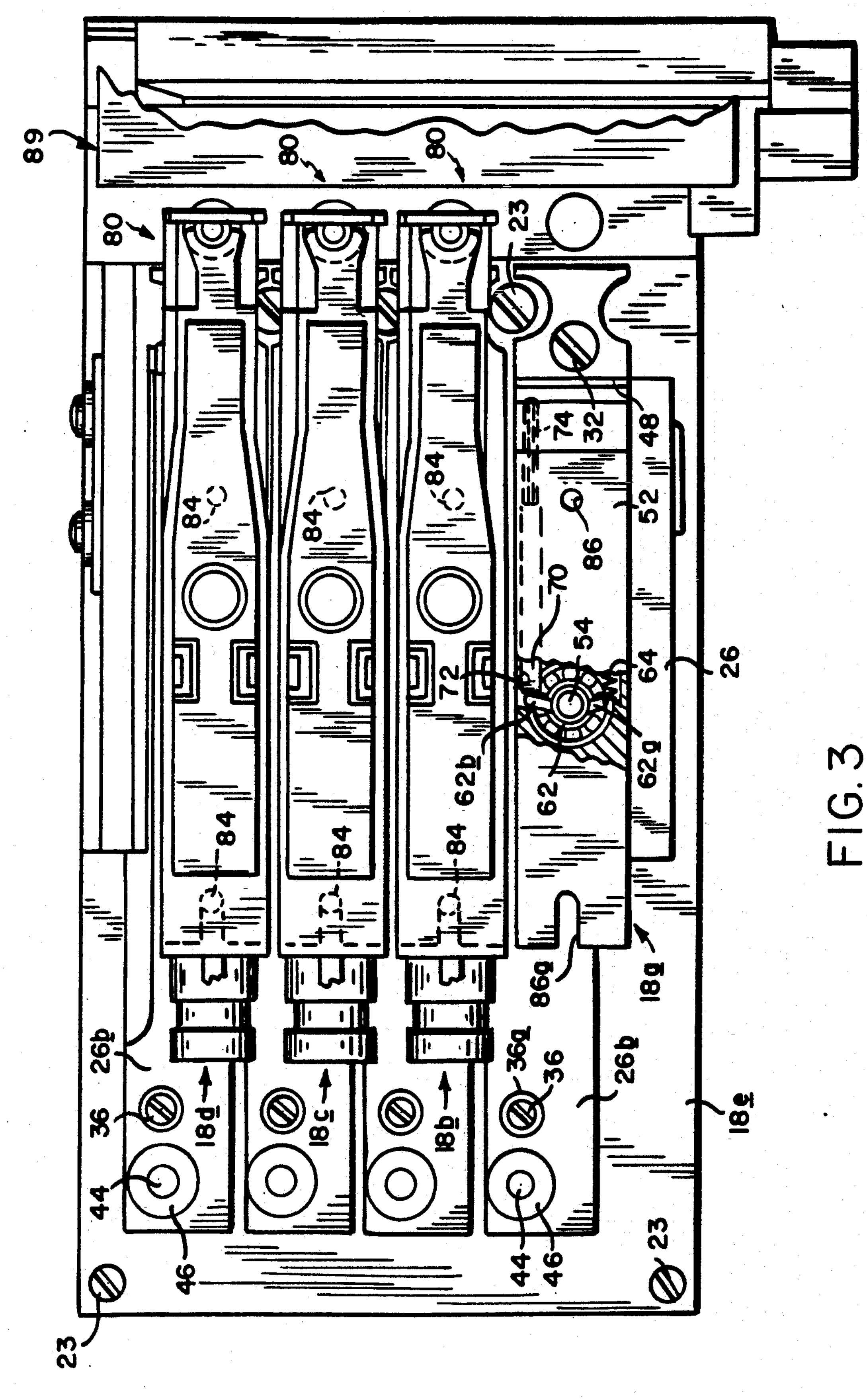
FIG. 3 is a plan view of the print head of the FIG. 1 printer.
Figure 4:
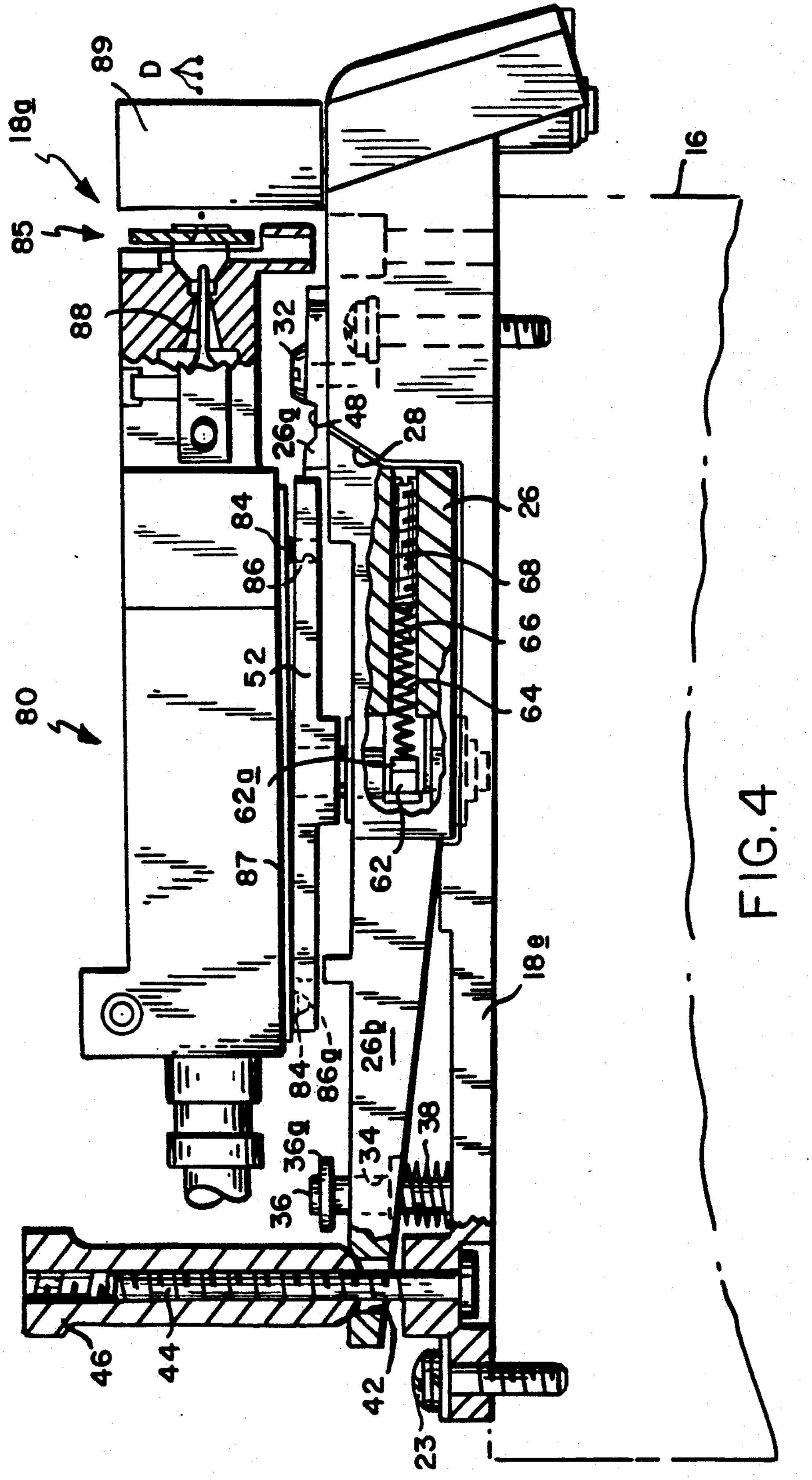
FIG. 4 is a right side view, partially exploded and with parts broken away, of the FIG. 3 print head.

Referring now to FIGS. 3 to 5, since the print head sections 18*a* to 18*d* are all substantially identical as aforesaid, we will only describe jet section 18*a* in detail. It comprises an elongated mounting block 26 which seats in a well 28 formed in the upper surface of the print head base plate 18*e*. Block 26 has a flange 26*a* at its forward end facing drum 12 which overlies base plate 18*e*. That flange is secured to the base plate by a threaded fastener 32. The opposite or rear end segment 26*b* of block 26 has an upwardly inclined undersurface and a vertical passage 34 for receiving a machine screw or pin 36 which projects up from base plate 18*e*. That block segment 26*b* is urged upwardly by a coil spring 38 engaged around pin 36 between the base plate 18*e* and the block segment 26*b*. A collar 36*a* extending around the upper end of pin 36 limits the upward motion of the block segment 26*a*.

The block segment 26*b* has a second passage 42 behind passage 34 for receiving a threaded fastener 44 which projects up from base plate 18*e*. A thumb wheel 46 is threaded onto fastener 44 so that it engages the top of block segment 26*b*. Thus, by turning the thumb wheel 46 further down on fastener 44 the block segment 26*b* may be forced downwardly in opposition to the bias of spring 28 thereby swinging the block about a transverse resilient living hinge 48 in the block forward flange 26*a*.

Still referring to FIGS. 3 to 5, and as best seen in FIG. 5, overlying block 26 is an elongated nozzle index plate 52 made of a ferromagnetic material. A shaft 54 pinned in plate 52 extends down through a vertical passage 56 in block 26 and is rotatively mounted to the block by upper and lower bearing units 58 so that plate 52 is free to pivot to a limited extent on block 26.

The rotation of shaft 54 and, therefore, of index plate 52 is achieved by way of a shaft carriage 62 mounted to shaft 54 between bearing units 58. As best seen in FIG. 3, carriage 62 has a pair of arms 62*a* and 62*b* which extend out from shaft 54 almost diametrically. As shown in FIGS. 3 and 4, carriage arm 62*a* is engaged by one end of a compression spring 64 positioned in a longitudinal passage 66 extending in from the forward end of block 26. The compression spring 64 is compressed by a set screw 68 threaded into the forward end segment of passage 66. Thus, spring 64 tends to rotate shaft 54 and plate 52 clockwise as viewed in FIG. 3.

The other carriage arm 62*b* is engaged by one end of a rod-like piezoelectric (PZT) actuator 70 slidably positioned in a longitudinal passage 72 in block 26 at the opposite side of the block. Actuator 70 is held in place within the passage by a set screw 74 threaded into the forward end segment of passage 72. Electrodes 70*a* are present at opposite faces of actuator 70. When a voltage $V_P$ is applied to the electrodes by way of electrical leads 76 (FIG. 5), actuator 70 will elongate to varying degrees depending upon the applied voltage. In the illustrated printer, this voltage may be varied between 0 and 100 volts in increments. Such elongation of the actuator 70 causes the shaft 54 and plate 52 to rotate counterclockwise as viewed in FIG. 3 in opposition to the bias of spring 64. Thus, by the application of different voltages to the actuator 70, the yaw of plate 52 can be adjusted quite accurately.

Referring to FIGS. 3 and 4, each print head section 18*a* to 18*d* also includes a nozzle unit 80. In FIG. 3, units 80 are shown on sections 18*b*, 18*c*, and 18*d*, whereas the nozzle unit on section 18*a* is removed. In FIG. 4, nozzle unit 80 is shown in the process of being installed in section 18*a*.

Nozzle unit 80 is arranged to seat on the index plate 52. It is located relative to the plate by two locating pins 84 at the underside of the nozzle unit 80 adjacent to the forward and rear ends thereof. These pins are received, respectively, in a hole 86 near the forward end of index plae 52 and in a slot 86*a* at the rear end of that plate. A magnetic plate 87, mounted to the underside of nozzle unit 80, is attracted to plate 52 which, as noted previously, is made of a ferromagnetic material. Thus, unit 80 is firmly held magnetically in place against plate 52. Yet, the nozzle unit can be removed quickly and easily in the event that is required in order to repair or replace the unit.

When the nozzle unit 80 is seated on the index plate 52, it will be understood that all of the required electrical and fluid connections to unit 80 are made either directly or via base plate 18*e* and/or block 26 to enable the nozzle unit to direct a jet or stream of droplets D to the paper sheet S on roll 12, as described in the aforesaid patent.

The internal construction of nozzle unit 80 is not part of this invention. Suffice it to say that unit 80 includes a capillary 88, shown in FIG. 4, which ejects a stream or jet of ink droplets D through a charging tunnel 85 (FIG. 4) and through a deflection unit 89 mounted to base plate 18*e* in front of unit 80. Selected ink droplets are charged in the charge tunnel 85, and then are deflected into a knife edge or gutter as they pass through deflection unit 89. The droplets D that are not deflected travel on to the sheet S on drum 12. It should be understood, however, that the droplets D that are not deflected still carry a small electric charge so that sucessive droplets in the jet will repel one another and remain spaced apart in the jet or stream. Use will be made of this residual charge during the calibration procedure as will be described shortly. The operation of the deflection unit 89 is described in detail in the aforesaid patent.

Referring now to FIGS. 1 and 2, printer 10 also includes calibration apparatus shown generally at 90 located to the left of drum 12. The calibration apparatus has a base plate 92 mounted to the machine frame 13 (FIG. 2) and which supports an elongated target block 94 made of a nonconductive material. Formed integrally with block 94 at the end thereof remote from drum 12 is a depending leg 96 which is mounted to plate 92 by way of a spacer block 98. Leg 96 is connected to block 94 by means of a living hinge 102 so that the block is cantilevered above plate 92. A large opening 104 is formed in the face of block 94 which faces the print head 18. Opening 104 extends an appreciable distance into the block and the length of the opening preferably exceeds the width of the print head 18.

Mounted to the underside of plate 92 under the free end of block 94 is a stepper motor 106 which projects up through an opening 108 in that plate. As best seen in FIG. 2, the stepper motor armature (not shown) is received in a split sleeve 110 having an integral colinear lead screw 112 projecting from its opposite end. Lead screw 112 is threaded into a passage 114 extending up through the free end portion of block 94. Thus, when stepper motor 106 is rotated in one direction or the other, the free end of block 94 swings about its living hinge 102. As will be seen later, the block swings through a very small angle so that the motion of the block is essentially linear. As shown in FIG. 1, a spring 116 may be compressed between plate 92 and block 94 to urge the free end of the block upward to eliminate play in the threaded connection between lead screw 112 and block 94.

Still referring to FIGS. 1 and 2, an angled passage 122 is provided in the bottom wall of the opening 104 in block 94 adjacent to the free end of the block. Pressfit in passage 122 is a tubular needle shroud 124. Positioned coaxially within shroud 124 is an electrically conductive needle sensor 126 which projects from the end of a thumb screw 128 threaded into the lower end of shroud 124.

The needle sensor 126 is angled relative to the axis of lead screw 112 and the calibration apparatus 90 is oriented about the axis A of drum 12 so that when the free end of the target block 94 is moved by stepper motor 106 as aforesaid, the tapered tip 126*a* of the needle sensor 126 moves along a tangent of an imaginary leftward extension of drum 12 as is seen in FIG. 2. The distance from the needle sensor 126 to the left image or print margin M is calibrated mechanically at the factory and is a known constant in the printer's firmware. Preferably, the needle tip 126*a* is at a position corresponding to the intersection of each ink jet with the sheet S on drum 12. Stepper motor 106 can be controlled to move needle sensor 126 over a short distance from a home position $N_H$. An optical sensor 130 mounted by a bracket 132 to base plate 92 adjacent to the free end of target block 94 senses a "flag" on the end of the block to fix the home position $N_H$.

When not printing, carriage 14 and print head 18 thereon are movable along lead screw 20 and guide rods 22 leftward beyond drum 12 to the home position $P_H$ at which the exit oriface of the capillary 88 (FIG. 4) in nozzle unit 80 of print head section 18*a* is directly opposite the position $P_H$ in FIG. 1 at the mouth of the opening 104 in target block 94. As shown there, when the print head is in its home position, all of the nozzle units 80 are located opposite opening 104. A plate electrode 132, carrying a charge opposite to the charge on droplets D, is provided on the upper wall of opening 124 so that when the print head sections 18*a* to 18*d* are fired for test purposes, the ink jets therefrom will travel to electrode 132.

As shown in FIG. 1, the bottom wall of passage 104 slopes downwardly and rearwardly to a drain 134 connected to a pipe 136 which leads to a vacuum source (not shown) which sucks away any ink and mist present in opening 104. A vacuum is also drawn in the needle shroud 124 to prevent ink build-up on the needle which could spoil the calibration results as will be described later. For this, a conduit 138 (FIG. 1) leads from the interior of shroud 124 to a pipe 142 at the free end of block 94. Pipe 142 is also connected to the aforesaid vacuum source.

As will be described presently, the calibration procedure for each print head section 18*a* to 18*d* is carried out with the nozzle unit 80 for that section being positioned directly opposite the needle sensor 126 so that the ink jet issuing from that nozzle unit will intercept or intersect the needle tip 126*a* and, preferably also, be aimed directly at an extension of the drum axis A as shown in FIG. 2.

It is important to note that the calibration procedure carried out for the jets applies just as well to the actual ink dots formed on the sheet S by those jets. This is because, as noted above, the position of the sensor tip 126*a* corresponds to the intersection of each jet with sheet S. That is, it bears the same relationship to the print head 18 and the drum axis A as any point on sheet S being printed on.

When a print head section 18*a* to 18*d* is positioned opposite sensor 126 and is actuated so that the charged ink droplets D projected from a unit 80 strike sensor 126, this produces a current signal in the sensor. The lower end of the needle is connected to an amplifier 172 which amplifies that signal and applies it to a threshold detector 174. If the signal is above a selected minimum value, it is digitized by an A/D converter 176 and coupled to a processor/controller unit 180.

Processor/controller unit 180 controls the operation of the calibration apparatus 90, as well as the operations of the other parts of the printer to enable them to perform the functions normally carried out by an ink jet printer of this general type. Thus, during the calibration procedure, the processor/controller unit 180 receives the signals from the home sensors 24 and 130 and provides control signals to drive the stepper motor 106 in calibration apparatus 90 and to drive the stepper motor (not shown) which moves the print head carriage 14. It also provides the control voltages to PZT actuators 70 which aim the nozzle units 80 in print head sections 18*a* to 18*d*. The operator may input instructions to the unit 180 by means of a suitable control panel or key pad 182.

Listed below are relevant characteristics of an exemplary printer incorporating the present invention:

| | | |
|---|---|---|
| Sensor 126 | 0.025 | in. |
| | 990 | microsteps |
| Sensor tip 126a maximum eccentricity | +/−.005 | in. |
| | 198 | microsteps |
| Each stepper motor 106 step | 0.000070 | in. |
| Sensor 126 vertical adjustment range | .030 | in. |
| | 429 | steps |
| Nominal nozzle 80 (capillary 88) spacing | 0.50 | in. |
| Actuator 70 full range (0–100 V) | 0.0071 | in. |
| Actuator 70 full range error (+/−10%) | +/−0.00071 | in. |
| Smallest actuator 70 increment (full range/256) | 0.0000278 | in. |
| Distance between first nozzle unit 80 (print head section 18a) and needle sensor 126 when print head in home position $P_H$ | 1.037 | in. |
| 200 Quarter-Steps Per Lead Screw Motor Rev. | | |
| 1386 Encoder Pulses Per Drum Rev. | | |
| 0.25 Print Head Inches Per Lead Screw Motor Rev. | | |

| μSTEPS/ | INCHES/ | IDEAL | IDEAL μSTEPS/ | PLL | PLL | REAL μSTEPS/ | REAL | ERROR (IN.) OVER |
|---|---|---|---|---|---|---|---|---|

-continued

| STEP | μSTEP | DPI | RASTER | N | D | RASTER | DPI | 18 IN. |
|---|---|---|---|---|---|---|---|---|
| 126 | 0.00000992 | 200.00 | 504.00 | 8 | 22 | 504.00 | 200.00 | 0.00000 |
| 128 | 0.00000977 | 203.20 | 503.94 | 8 | 22 | 504.00 | 203.17 | −0.00225 |
| 126 | 0.00000992 | 240.00 | 420.00 | 10 | 33 | 420.00 | 240.00 | 0.00000 |
| 120 | 0.00001042 | 254.00 | 377.95 | 6 | 22 | 378.00 | 253.97 | −0.00225 |
| 126 | 0.00000992 | 300.00 | 336.00 | 8 | 33 | 336.00 | 300.00 | 0.00000 |
| 128 | 0.00000977 | 304.80 | 335.96 | 8 | 33 | 336.00 | 304.76 | −0.00225 |

As a preliminary to, or as a part of, the calibration procedure, the printer determines the velocity of the droplets D in each ink jet from print head 18. This velocity can vary from, say, 35 meters/second to 50 meters/second, depending on capillary 88 diameter and other factors. The distance from the point at which the droplets D form and acquire charge and the paper sheet S is approximately 13 millimeters. Therefore, the time difference between a transition in the charging signal and paper contact can vary between 260 and 370 microseconds, or a 90 microsecond difference between any two jets. The time difference between adjacent pixels or dots printed on sheet S can be as little as 13 microseconds at the highest resolutions and drum 12 speeds. Therefore, the velocity differences between jets can cause drop misplacements of as much as seven dots in the direction of paper motion. In order to compensate for the different delays, the droplet velocity of each jet is measured and, with one jet being used as a reference, the data signals to the other jets are advanced or retarded in time to correct drop misplacements.

The jet droplet D velocity is determined by measuring the time difference between a transition in the drop charging and the time at which the transition is sensed at sensor 126. In other words, the processor/controller unit 180 generates timing signals and controls charge tunnel 85 so that the tunnel applies a selected different charge to a succession of droplets D to "flag" those droplets. The unit 180 also includes a counter which counts the timing signals. The count starts when the transition occurs and ends when sensor 126 senses the flagged droplets. The time it takes for the droplets to travel between the charging tunnel 85 and sensor 126 (which is at the same distance as the sheet S) can be read directly from the counter in, say, units of tenths of a microsecond. This resolution is accurate to within 1/130th of a pixel or dot at the highest drum 12 speed. Actually for best results, a large number of velocity measurements are made and statistical methods are used to calculate an accurate result.

Figure 6A:
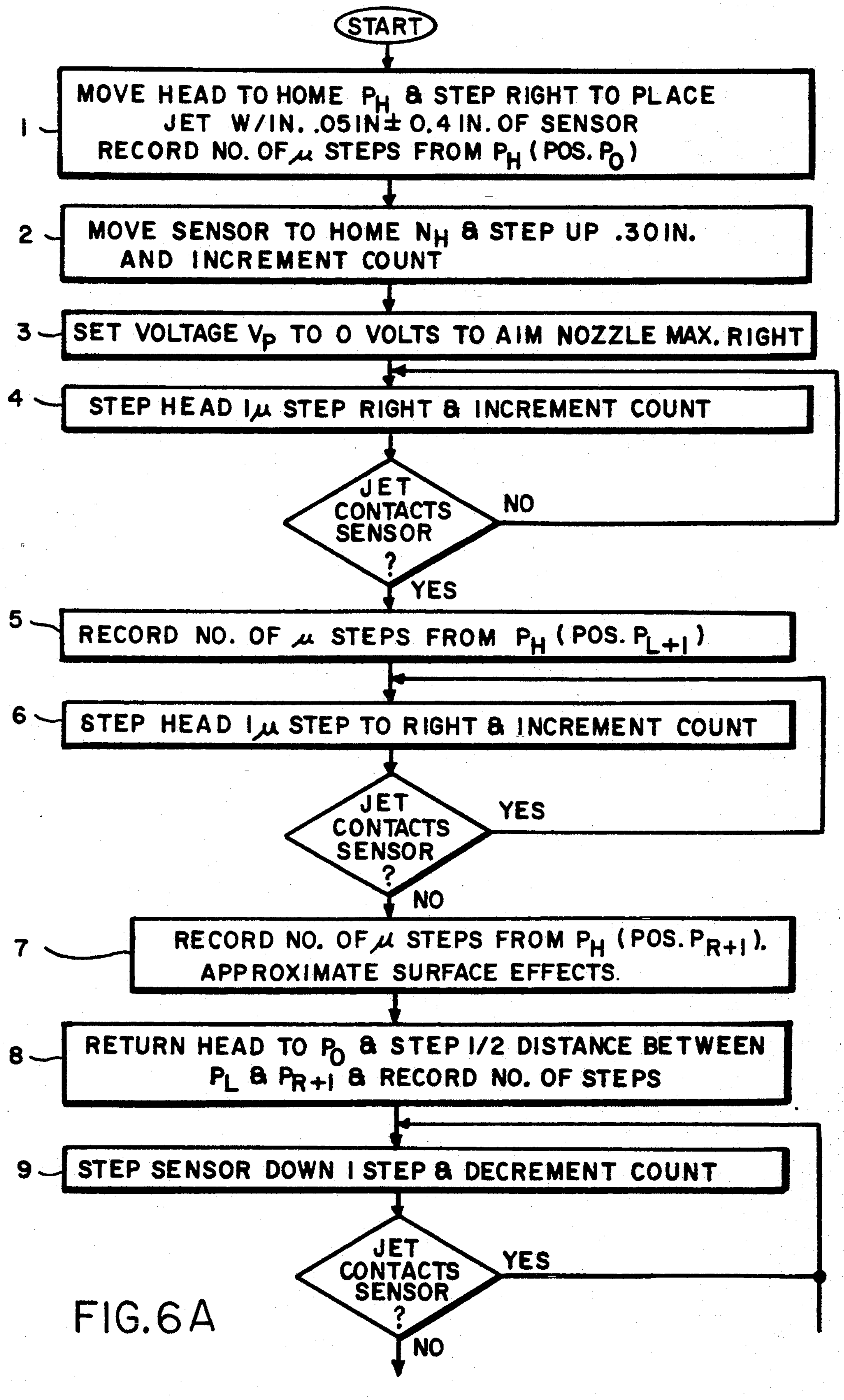
FIGS. 6A to 6C and 7 are flow charts describing the calibration procedure.
Figure 6B:
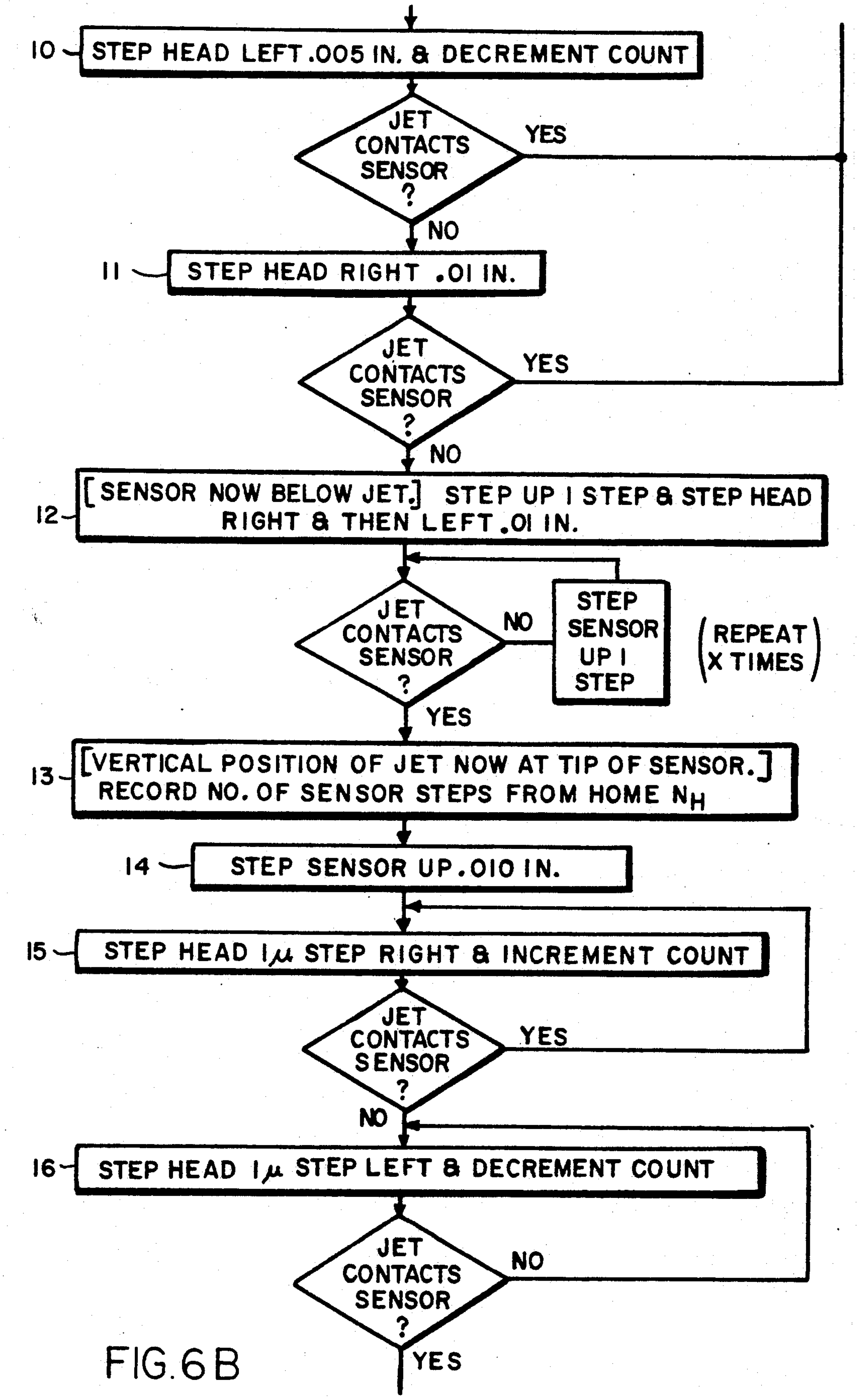
Figure 6C:
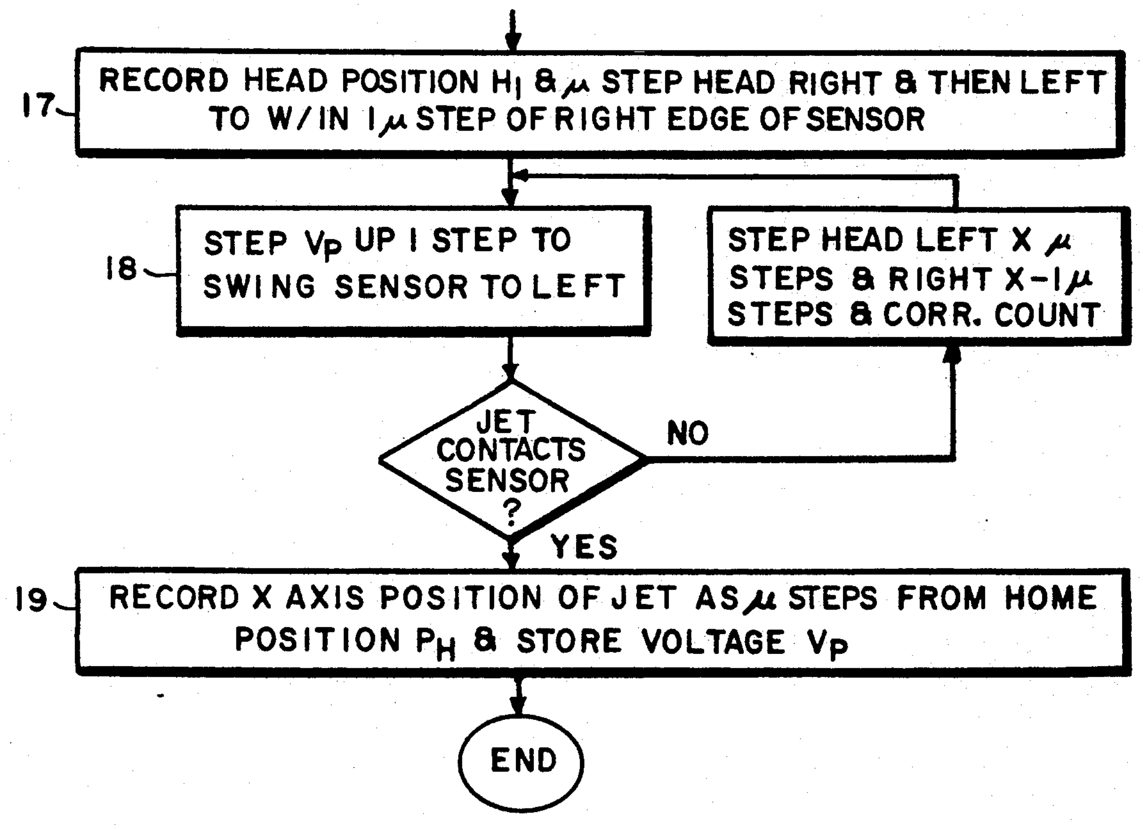

Referring now to FIGS. 6A to 6C, the operator initiates the auto calibration procedure using key pad 182. This causes the processor/controller unit 180 to execute, for this example, the algorithm depicted in FIGS. 6A to 6C. For calibration, it is assumed that the ink jet produced by each nozzle unit 80 will intercept the needle sensor 126 at some setting over the adjustment range of the sensor.

At the beginning of the calibration procedure, processor/controller unit 180 actuates the righthand print head section 18*a* (first to print and deemed the reference section) so that it emits an ink jet and activates the vacuum source serving pipes 136 and 142 in apparatus 90. It also moves the print head 18 to its home position $P_H$ and then steps the head right 0.44 in. so that the jet from capillary 82 in section 18*a* is within 0.05 in. ±0.04 in. of the needle sensor 126. This ready position of the head is designated $P_O$. The unit 180 then moves sensor 126 to its home position $N_H$ and steps the sensor up 0.030 in. so that the jet is at a height that will intercept the sensor. This is the sensor ready position $N_O$. In addition, the unit 180 sets the voltage $V_P$ to actuator 70 to zero volts so that nozzle unit 80 of head section 80*a* has maximum yaw to the right.

Next, the processor/controller unit steps the print head 18 to the right slowly until the ink jet has contacted the left edge of sensor 126. The unit 180 receives a signal from A/D converter 176 indicating such contact; no more than 2000 microsteps should be required to accomplish this. The controller unit records the head position in microsteps from $P_H$ at the point of contact. This position is designated as $P_L+1$ and the head position at the previous step is $P_L$. The unit 180 continues stepping print head 18 to the right until the ink jet from nozzle unit 80 just loses contact with the right edge of sensor 126. The unit 180 records this head position in microsteps from $P_H$. This position is demoninated $P_R+1$, the head position at the previous step being $P_R$. The processor/controller unit then returns head 18 to $P_O$ and steps the head to half the distance between $P_L$ and $P_R+1$, i.e. $P_L+(P_R+1-P_L)/2$. This positions the jet from head section 18*a* at the approximate center of needle sensor 126. The number of microsteps to reach this position is recorded.

The next phase of the calibration procedure is to find and record the vertical (Y axis) position of the ink jet by finding the tip 126*a* of sensor 126. To do this, unit 180 activates stepper motor 106 to move sensor 126 down one step at a time until the ink jet no longer contacts the sensor. Then, to account for sensor tip taper and eccentricity, the controller steps the print head 18 left 0.005 in. If the jet contacts the sensor, the sensor is stepped down further until the jet no longer touches the sensor. Unit 180 then steps head 18 0.01 in. to the right. If the signal from A/D connector 176 indicates that the jet has contacted the sensor, the processor/controller unit repeats the vertical sensor adjustment by returning to step 9 of the FIGS. 6A to 6C algorithm. On the other hand, if the jet does not contact the sensor, this indicates that the sensor is definitely below the jet.

Next, unit 180 steps the sensor up one step and moves the print head right, and then left, 0.01 in. If the jet contacts the sensor tip 126*a*, unit 180 records the sensor tip height in steps from the sensor home position $N_H$. If there is no contact, the processor/controller unit steps the sensor up one step and steps the head back and forth again. This process is repeated until contact is made with the sensor tip 126*a*.

It should be mentioned at this point that when sensing the interception of the jet with the sensor tip 126*a*, the sensing is most accurate when moving the sensor up into the ink jet or stream from nozzle unit 80. That is, when moving the sensor in the opposite direction, i.e. out of the ink stream, surface effects seem to make the jet "bend" into the sensor tip thereby degrading the position measurement. For the same reason, sensing contact while moving the jet into the sensor from the side is more accurate then sensing loss of contact.

This is also why it is important to provide the shroud 124 around sensor 126 in which a vacuum is drawn during calibration. This minimizes the buildup of ink on the needle sensor that could change the apparent diameter or height of the sensor and thus upset the jet position measurements.

Next, the unit 180, beginning at step 14 in FIG. 6B, determines the horizontal (X axis) position of the ink jet from head section 18*a* by touching the side of the sensor a fixed distance below sensor tip 126*a*. Thus, with the voltage $V_P$ still at zero volts, (i.e. maximum right yaw), the processor/controller unit steps sensor 126 up 0.010 in. The jet now intercepts the sensor 0.010 in. below tip 126*a*. Next, the unit 180 steps head 18 to the right until the signal from A/D converter 176 indicates that the jet no longer contacts the sensor. Unit 180 then moves head 18 to the left until the jet regains contact with the sensor. As noted above, to maximize accuracy, a making, rather than a loss, of contact between the jet and sensor is detected. Next, the head is stepped right and then left to within 1 microstep of the sensor's right edge.

Continuing the procedure, the unit 180, at step 18, increases the voltage $V_P$ applied to PZT actuator 70 to move the discharge oriface of nozzle unit 80 leftward (i.e. counterclockwise rotation) until it is detected that the jet has just touched the sensor. Using the actuator to move the nozzle in this direction is preferable because the elongating actuator applies more turning force than the spring 64. The processor/controller unit 180 now records the print head position in terms of microsteps from the home position $P_H$. It also stores data representing the magnitude of voltage $V_P$. If the jet does not contact the sensor, the unit 180 steps the print head left X microsteps and then right X-1 microsteps and repeats step 18 of the FIGS. 6A to 6C algorithm.

Thus, at this point in the procedure, the vertical and horizontal positions of the ink jet from head section 18*a* are recorded in the processor/controller unit 180 in terms of the number of steps from sensor home position $N_H$ and number of steps from print head home position $P_H$. A number representing voltage $V_P$ is also stored so that it is present at a D/A converter to maintain that voltage on the actuator 70 of print head unit 18*a*.

Figure 7:
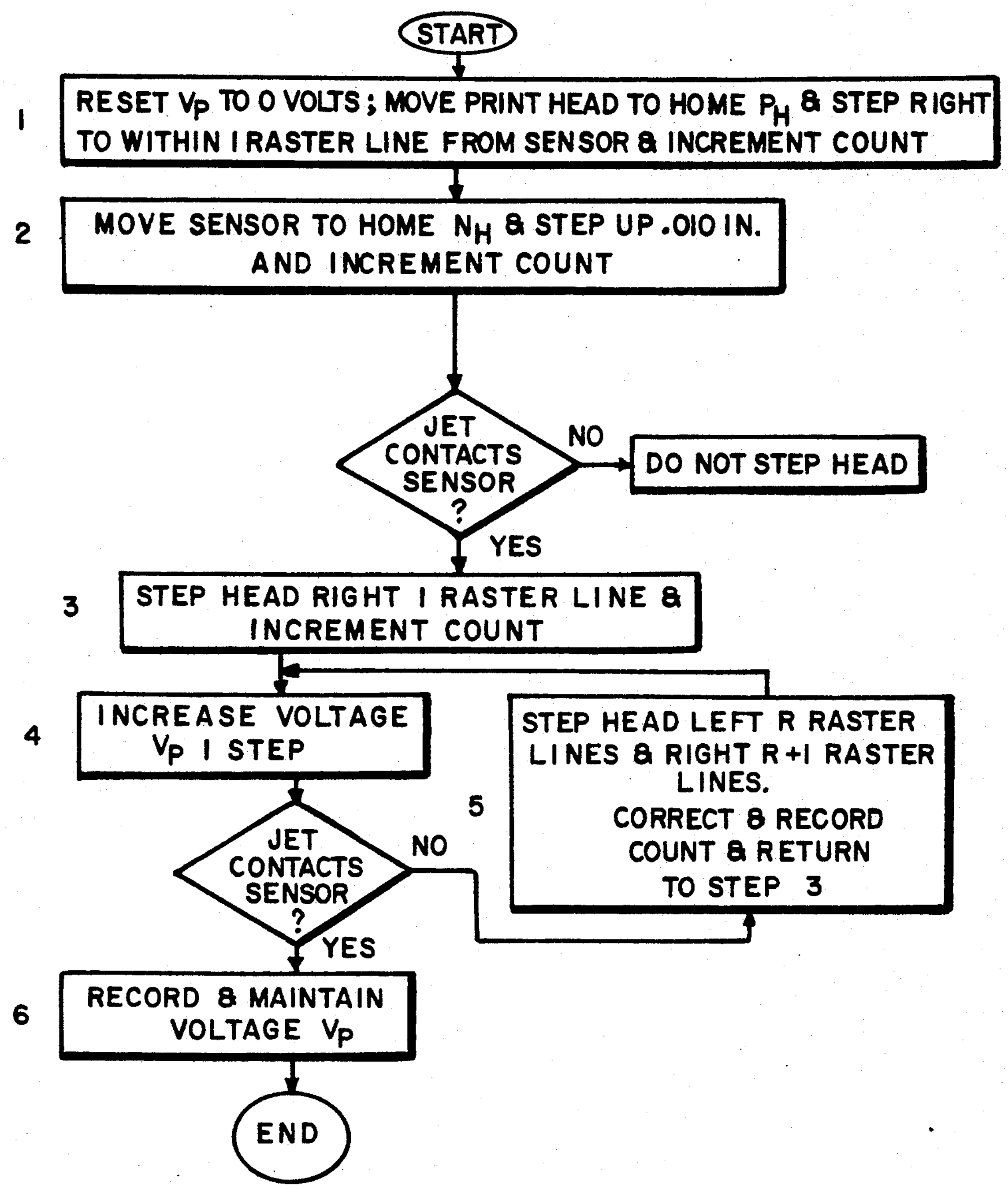

Referring now to FIG. 7, the unit 180 may also determine the correct voltage $V_P$ for head section 18*a* that will align the jet from nozzle 80 of section 18*a* to the centers of the raster lines L. For this, it is assumed that unit 180 has calculated the nearest integer number of raster lines L between jets, based on the resolution selected for the image being printed.

To perform this last correction, unit 180 resets $V_P$ to zero volts and returns print head 18 to home position $P_H$ and steps the head so that the jet from the first head section 18*a* is within 1 raster line L to the right of sensor 126. The controller unit also steps the sensor up 0.010 in.,i.e. the sensor position after step 14 in FIG. 6. If the jet contacts the sensor, the processor/controller unit steps the print head right one raster line L. The unit 180 then increases voltage $V_P$ until the jet contacts the sensor and records and maintains that voltage. If the jet never contacts the sensor, unit 180 steps the head 18 left R raster lines and then right R-1 raster lines and corrects the recorded raster count and returns to step 3 of the FIG. 7 algorithm.

The calibration of head section 18*a* being completed, the processor controller unit 180 now resets the voltage $V_P$ to zero volts and positions the nozzle of the second print head section 18*b* within 0.05±0.04 in. from sensor. That is, the unit 180 substitutes the 0.50 in. spacing between nozzles 80 for the 0.037 in. spacing between the first nozzle 80 and the sensor and steps the head 0.437 in. at step 1 of FIG. 6A and re-executes the FIGS. 6A to 6C and 7 algorithms. The same procedure is repeated for the remaining head sections 18*c* and 18*d*, with the nozzle spacing staying the same in FIG. 6A, step 1.

Thus, at the end of the calibration procedure, the processor/controller 180 has stored the absolute distance (in head steps) from the head home position $P_H$ to the intersection of the jet from the reference print head section 18*a* with the sensor 126. Since, as noted previously, the axial distance between the sensor and the left image margin M is fixed and stored in controller 180, the processor/controller can, by simple addition, determine and store the distance between home position $P_H$ and the margin M with respect to the adjusted print head section 18*a*. Also, as noted previously, unit 180 has determined and stored the absolute distance from the print head home position $P_H$ to the intersection with the sensor of the jets from each of other three print head sections 18*b* to 18*d*. It has also determined and stored the height of each of those jets relative to the needle home position $N_H$. Consequently, by simple subtractions, the processor/controller unit 180 can calculate and store the relative separations between the jets from print head sections 18*b* to 18*d* and the jet from the reference section 18*a*, in both the X and Y axis directions. In addition, the unit 180 has determined and stored the actuator 70 voltage required to aim the jet from each of print head sections 18*a* and 18*d* to the center of a line in the raster being scanned by the printer 10. These voltages may be maintained until the next calibration or until the resolution (i.e. raster line count) of the image being printed is changed.

Thus during printing, processor/controller unit 180 "knows" the exact position that an ink dot from each print head section 18*a* to 18*d* would have on sheet S, if printed, at any instant in the printing cycle. Therefore, it can time the actuation of those sections so that at any given dot position on sheet S, sections 18*b* to 18*d* will print different color dots which are in register with the dot printed by the section 18*a* used as the reference.

The needle home sensor 130 in the exemplary apparatus is set mechanically at the factory.

It will thus be seen that the objects set forth above, among those made apparent from the preceding description, are efficiently attained and, since certain changes may be made in the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described.

What is claimed as new and desired to be secured by Letters Patent of the United States is:

1. Calibration apparatus for an ink jet printer including a recording medium support having an axis and a support surface, and a print head which emits an ink jet and is movable parallel to said axis in an axial direction along said support surface between a head home position and a position beyond one end of the support surface, said apparatus comprising head home detection means for detecting the presence of the print head at said head home position and emitting a head home signal in response thereto;

an ink jet sensor positioned at a selected distance in said axial direction beyond said one end of the support surface and movable perpendicular to said axis between a sensor home position at a selected location relative to said recording medium support and a position at which the sensor can intersect said ink jet, said sensor emitting a sensor signal when said sensor does intersect said ink jet;

means for detecting the presence of said sensor at said sensor home position and emitting a sensor home signal in response thereto;

first moving means and second moving means for moving the print head and sensor, respectively, from their respective home positions over first and second distances so that the sensor intersects said ink jet, and a controller responsive to said head home signal and said sensor home signal and said sensor signal for determining and storing said first and second distances.

2. The apparatus defined in claim 1 wherein the head home position is also beyond said one end of the support surface.

3. The apparatus defined in claim 1 and further including means adjacent to the sensor for collecting the ink comprising said ink jet when the print head is opposite the calibration apparatus.

4. The apparatus defined in claim 1 wherein the first moving means move the print head in steps and the controller stores said first distance as an integral number of steps from said head home position, and further including means on the print head responsive to ink jet aiming signals for aiming the ink jet along said axial direction between a reference location and a second location spaced from the reference location, and means for producing ink jet aiming signals when the head is stepped to position the ink jet within one step of said intersection.

5. The apparatus defined in claim 1 wherein the recording medium support is a rotary drum, the support surface is the cylindrical surface of the drum and said axis is the drum axis.

6. The apparatus defined in claim 5 wherein the ink jet sensor comprises the tip of an electrically conductive needle.

7. The apparatus defined in claim 6 and further including means for drawing a vacuum in the space around said needle.

8. The apparatus defined in claim 7 wherein the vacuum drawing means comprise a tubular shroud surrounding said needle and means for connecting the interior of said shroud to a vacuum source.

9. The apparatus defined in claim 7 wherein the sensor is mounted in a movable block defining an ink receptacle adjacent to the sensor for collecting the ink comprising said ink jet when the print head is opposite the calibration apparatus.

10. The apparatus defined in claim 9 wherein said block is movable in said perpendicular direction along with said sensor.

11. Calibration apparatus for an ink jet printer having a rotary drum which has a cylindrical surface and which rotates about an axis, a print head which is movable parallel to said axis in an axial direction along the drum surface between a head home position and a position beyond one end of the drum, said head projecting an ink jet comprised of ink droplets towards said drum surface, said apparatus comprising a needle-like ink jet sensor having a needle tip positioned at a selected distance in said axial direction beyond said one end of the drum and having a sensor axis perpendicular to the drum axis, said sensor being movable in the direction of said sensor axis between a sensor home position at a selected location relative to the drum and a position in which the sensor can intercept the ink jet, said sensor producing a sensor signal when said sensor does intercept the ink jet;

first and second detectors for detecting the presence of the print head and sensor in their respective home positions and producing head home signals and sensor home signals in response thereto;

first moving means and second moving means for moving the print head and sensor, respectively, from their respective home positions over first and second distances to positions at which the sensor tip intercepts the ink jet;

a controller responsive to the sensor signal and the head home signals and the sensor home signals for determining and storing said first and second distances.

12. The apparatus defined in claim 11 wherein the sensor is electrically conductive, and further including means for charging the ink droplets comprising the ink jet so that when the sensor intercepts the ink jet, a sensor signal is initiated in the sensor, and means for detecting said sensor signal.

13. The apparatus defined in claim 12 and further including means for inhibiting the build up on the sensor of ink from the ink jet.

14. The apparatus defined in claim 13 wherein the inhibiting means comprise a tubular coaxial shroud encircling the sensor, and means for connecting the interior of the shroud to a vacuum source.

15. The apparatus defined in claim 14 and further including means adjacent to the sensor for collecting ink comprising the ink jet when the print head is opposite the calibration apparatus, and means for removing the collected ink from the ink collecting means.

16. The apparatus defined in claim 11 wherein said first and second moving means move the print head and sensor in steps, and said controller determines said first and second distances in terms of the number of steps from the head home position and the sensor home position, respectively.

17. The apparatus defined in claim 11 wherein the print head includes a base;

a nozzle for projecting said ink jet;

means for pivotally connecting the nozzle to the base so that the jet can be aimed in said axial direction, and means for controllably pivoting the nozzle relative to the base when the ink jet is within one head step of intercepting sensor until the ink jet does intercept the sensor.

18. The apparatus defined in claim 17 wherein the pivoting means comprise an actuator acting between said base and said connecting means and responsive to an aiming signal for exerting torque on the connecting means, and means for applying an aiming signal of a selected magnitude to the actuator so that the actuator pivots the nozzle until the ink jet intercepts the sensor.

19. The apparatus defined in claim 11 wherein the print head includes a base;

a nozzle for projecting said ink jet;

means for pivotally connecting the nozzle to the base so that the ink jet can be aimed in said axial direction;

means responsive to an aiming signal for pivoting the nozzle relative to the base, and means for producing an aiming signal.

20. A method of calibrating an ink jet printer including a recording medium support having an axis and a support surface, and a print head which directs an ink jet along a trajectory to the support surface and is movable parallel to said axis in an axial direction along said support surface between a head home position and a position beyond one end of the support surface, said method comprising detecting the presence of the print head at said head home position and emitting a head home signal in response thereto;

mounting an ink jet sensor at a selected axial distance beyond said one end of the support surface so that the sensor is movable perpendicular to said axis between a sensor home position at a selected location relative to said recording medium support and a position at which the sensor can intercept said ink jet, said sensor emitting a sensor signal when said sensor does intercept said ink jet;

detecting the presence of the print head and the sensor at their respective home positions and emitting head home signals and sensor home signals in response thereto;

moving the print head and sensor from their respective home positions over first and second distances so that the sensor intercepts said ink jet, and determining from the head home signals and the sensor home signals and the sensor signal, said first and second distances.

21. The method defined in claim 20 and including the additional steps of processing the determined distance to produce control signals for the print head, and applying the control signals to the print head to control the trajectory of the ink jet.

22. The method defined in claim 20 where said distances are determined by moving the ink jet and sensor into contact with one another at the point of interception.

23. Calibration apparatus for an ink jet printer including a rotary drum having an axis of rotation and a cylindrical surface for supporting a printing medium, and a print head having a plurality of jetters for emitting ink jets and which is movable parallel to said axis in an axial direction along said support surface between a head home position and a position beyond one end of the drum, said apparatus comprising a head home detector for detecting the presence of the print head at said head home position and emitting a head home signal in response thereto;

a conductive needle having a tip, said needle being positioned beyond said one end of the drum and movable perpendicular to said axis between a needle home position at a selected location relative to said drum and a position at which the needle can intercept each of said ink jets, said needle conducting a current signal when said sensor does intercept each of said ink jets;

a needle home detector for detecting the presence of the needle at said needle home position and emitting a needle home signal in response thereto;

first motive means and second motive means for moving the print head and needle, respectively, from their respective home positions over first and second distances so that the needle tip intercepts each of said ink jets;

a controller responsive to the said current signal and said head home signal and said needle home signal for determining said first and second distances for each of said ink jets, said controller including a processor which processes the determined first and second distances to produce control signals for said jetters, and means for applying the control signals to the jetters so that the ink jets therefrom are all in registration on the printing medium.

* * * * *